United States Patent
Pan et al.

(10) Patent No.: US 9,174,588 B2
(45) Date of Patent: Nov. 3, 2015

(54) MOUNTING A MICROPHONE ON A VEHICLE HEADLINER

(71) Applicant: Bose Corporation, Framingham, MA (US)

(72) Inventors: Davis Y. Pan, Arlington, MA (US); Bradford Kyle Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 166 days.

(21) Appl. No.: 14/105,653

(22) Filed: Dec. 13, 2013

(65) Prior Publication Data

US 2015/0165983 A1 Jun. 18, 2015

(51) Int. Cl.
*B60R 11/02* (2006.01)
*H04R 1/08* (2006.01)
*B60R 11/00* (2006.01)

(52) U.S. Cl.
CPC ............. *B60R 11/0247* (2013.01); *H04R 1/08* (2013.01); *B60R 2011/0028* (2013.01); *B60R 2011/0059* (2013.01); *H04R 2410/05* (2013.01); *H04R 2499/13* (2013.01)

(58) Field of Classification Search
None
See application file for complete search history.

(56) References Cited

U.S. PATENT DOCUMENTS

| 5,009,606 | A | 4/1991 | Villeneuve et al. | |
|---|---|---|---|---|
| 6,650,233 | B2 | 11/2003 | DeLine et al. | |
| 6,801,632 | B2 | 10/2004 | Olson | |
| 7,171,006 | B2 | 1/2007 | Kimura | |
| 7,503,616 | B2 | 3/2009 | Linhard et al. | |
| 7,542,575 | B2 | 6/2009 | DeLine et al. | |
| 8,189,825 | B2 * | 5/2012 | Breed | 381/302 |
| 8,331,601 | B2 | 12/2012 | Gratke et al. | |
| 8,477,980 | B2 * | 7/2013 | Li et al. | 381/359 |
| 8,483,413 | B2 * | 7/2013 | Hartung et al. | 381/302 |
| 2002/0031234 | A1 | 3/2002 | Wenger et al. | |
| 2005/0190943 | A1 | 9/2005 | Disange et al. | |

FOREIGN PATENT DOCUMENTS

| JP | 2006327278 A | 12/2006 |
|---|---|---|
| JP | 2008137538 A | 6/2008 |
| JP | 4971220 B2 | 7/2012 |

* cited by examiner

*Primary Examiner* — K. Wong
(74) *Attorney, Agent, or Firm* — Bose Corporation

(57) ABSTRACT

A headliner assembly for a vehicle includes a headliner and a microphone. The headliner is configured for attachment to the vehicle such that the headliner separates a passenger cabin of the vehicle from a roof panel of the vehicle and such that a first surface of the headliner faces the roof panel, and an opposite, second surface of the headliner faces the passenger cabin. The microphone is mounted along the second surface of the headliner such that, when installed in the vehicle, the headliner is disposed between the microphone and the roof panel.

21 Claims, 9 Drawing Sheets

MOUNTING A MICROPHONE ON A VEHICLE HEADLINER

BACKGROUND

This disclosure relates to mounting a microphone on a vehicle headliner.

Many current vehicles in the marketplace are equipped with microphones either for enabling a vehicle occupant to engage in verbal communications with remotely located entity, or for detecting noise within a vehicle cabin as part of a noise cancellation system.

A current method of mounting a microphone in a vehicle headliner places the microphone on a roof-side of the headliner (i.e., in a region between the roof of the vehicle and a top surface of the headliner which faces the roof). A sensing hole is provided in the headliner directly below the microphone so the microphone can sense sound (e.g., vehicle noise) within the cabin. Such sensing holes are molded into the headliner in their desired position at the time the headliner is formed. Manufacturers typically mount a finishing grill over the microphone hole on the cabin-side of the headliner.

The sensing hole may allow air to rush in and out between the roof and passenger cabin sides of the headliner, which can result in false noise readings by the microphone. To help address this issue, in some cases, a sealing foam ring (e.g., a closed cell foam ring) is provided to seal the microphone and the sensing hole from the air space on the roof side of the headliner.

SUMMARY

One aspect provides a headliner assembly for a vehicle. The headliner assembly includes a headliner and a microphone. The headliner is configured for attachment to the vehicle such that the headliner separates a passenger cabin of the vehicle from a roof panel of the vehicle and such that a first surface of the headliner faces the roof panel, and an opposite, second surface of the headliner faces the passenger cabin. The microphone is mounted along the second surface of the headliner such that, when installed in the vehicle, the headliner is disposed between the microphone and the roof panel.

Implementations may include one of the following features, or any combination thereof.

In some implementations, the microphone is not coincident with any recess or opening in the headliner.

In certain implementations, the headliner assembly also includes one or more electrical wires arranged along the first surface of the headliner, and one or more contact pins for providing an electrical connection between the microphone and the one or more electrical wires.

In some cases, each of the one or more contact pins includes a pointed end for piercing through the headliner.

In certain cases, the one or more contact pins comprises barbs.

In some examples, the headliner assembly also includes one or more electrical contacts electrically connected to the microphone. Each of the one or more electrical contacts is configured to engage one of the one or more contact pins thereby to mechanically secure the microphone to the second surface of the headliner and to electrically connect the microphone to the one or more electrical wires.

In certain examples, the microphone is supported in a finishing grill, and the one or more electrical contacts is/are configured to engage the one or more contact pins thereby to secure the microphone and the finishing grill on the second surface of the headliner.

In some implementations, the electrical contact includes one or more electrical sockets electrically connected to the microphone. The electrical sockets include spring contacts for engaging the one or more contact pins.

In certain implementations, the spring contacts are configured to frictionally engage the one or more electrical contact pins in a wiping action.

In some cases, the headliner assembly includes a sub-assembly which includes the microphone, and a finishing grill. The sub-assembly is configured to engage the one or more contact pins thereby to mechanically secure the sub-assembly to the second surface of the headliner and to electrically connect the microphone to the one or more electrical wires.

In certain cases, the microphone is a noise collecting microphone for providing input to an active noise reduction system, the microphone being mounted such that a sound receiving portion of the microphone is arranged to face the passenger cabin of the vehicle.

In some examples, the microphone is mounted to the headliner with mounting hardware and the mounting hardware is configured to pierce holes in the headliner.

In certain examples, the headliner assembly also includes one or more electrical wires arranged along the first surface of the headliner, and the mounting hardware provides an electrical connection between the microphone and the one or more electrical wires.

In some implementations, the mounting hardware includes one or more contact pins each having a pointed tip for piercing through the headliner.

In certain implementations, the microphone is a MEMS microphone.

In some cases, the headliner assembly also includes a plurality of electrical wires arranged along the first surface of the headliner, a plurality of contact pins for providing electrical connection between the wires and the microphone, and a plurality of electrical contacts electrically connected to the microphone. The electrical contacts are configured to engage the contact pins thereby to establish an electrical connection with the electrical wires.

In certain cases, the electrical contacts include spring arms for engaging the contact pins.

In some examples, the contact pins are mounted on a contact mount that keeps the contact pins spaced apart at a predetermined distance.

Another aspect features a method that includes piercing holes in a vehicle headliner by passing contact pins into a first surface of the vehicle headliner, and through the vehicle headliner, such that portions of the contact pins extend beyond an opposite, second surface of the vehicle headliner, the first surface of the vehicle headliner being configured to face a roof panel of a vehicle, and the opposite, second surface of the headliner being configured to face a passenger cabin of the vehicle; and securing a microphone to the second surface of the vehicle headliner by connecting electrical contacts, which are attached to the microphone, to the portions of the contact pins which extend beyond the second surface of the vehicle headliner.

Implementations may include one of the above and/or below features, or any combination thereof.

In some implementations, the step of securing the microphone comprises securing the microphone such that, when installed in the vehicle, the vehicle headliner is disposed between the microphone and the roof panel, and such that the microphone is not coincident with any recess or opening in the headliner.

In certain implementations, the method also includes mounting the microphone in a grill and thereby forming a sub-assembly, and the step of securing the microphone to the second surface of the vehicle headliner comprises attaching the sub-assembly to the portions of the contact pins which extend beyond the second surface of the vehicle headliner.

DETAILED DESCRIPTION

Figure 1:
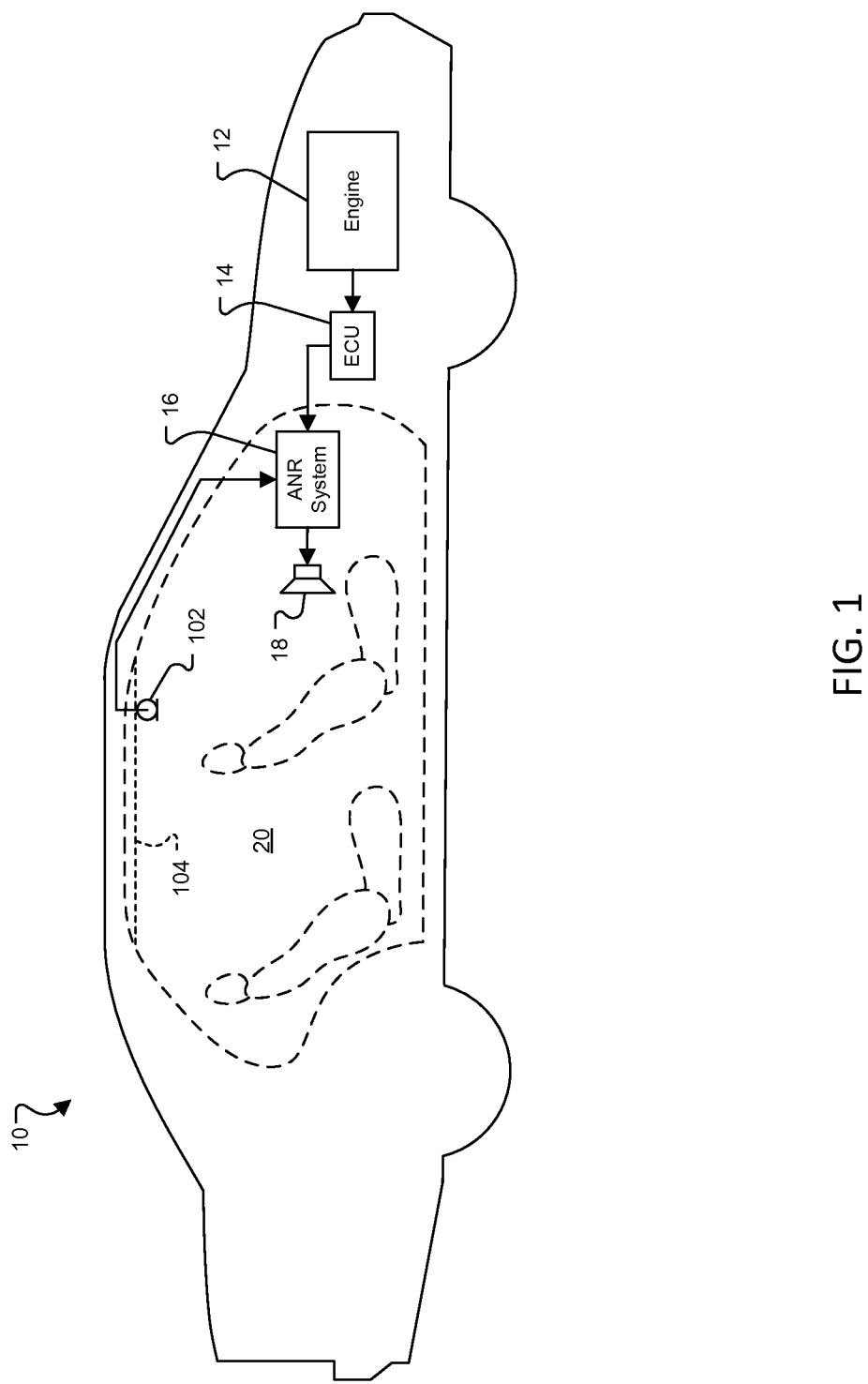
FIG. 1 is a schematic side elevational view of a vehicle incorporating a headliner assembly including a headliner mounted microphone.

With reference to FIG. 1, there is shown a non-limiting example of a vehicle 10 incorporating examples of the systems and apparatus disclosed herein. As shown in FIG. 1, the vehicle 10 has an engine 12 whose ignition control is performed by an engine ECU 14 and which supplies engine rotation pulses corresponding to explosion periods of the engine 12 through the engine ECU 14 to an active noise reduction system 16.

Noise that is primarily generated by the engine 12 is perceived by the ears of passengers seated in the passenger cabin of the vehicle 10. At least one microphone 102 is mounted on an inner, passenger cabin facing surface of a headliner 104. At least one speaker 18 is fixedly mounted in the vehicle 10 radiate canceling sounds for minimizing the sounds (noise) that are applied to the microphone 102. The active noise reduction system 16 generates a control signal that is supplied to the speaker 18 to radiate the canceling sounds.

The active noise reduction system 16 includes a reference signal generator for generating a sine-wave reference signal proportional to the frequency of engine rotation cycles from the engine rotation pulses and an adaptive filter for changing the phase and amplitude of the reference signal to generate the control signal to minimize the output signal from the microphone. An exemplary active noise reduction system is described in U.S. application Ser. No. 11/426,537, filed Jun. 26, 2006, now U.S. Pat. No. 8,194,873, issued Jun. 5, 2012, the complete disclosure of which is hereby incorporated by reference.

Figure 2:
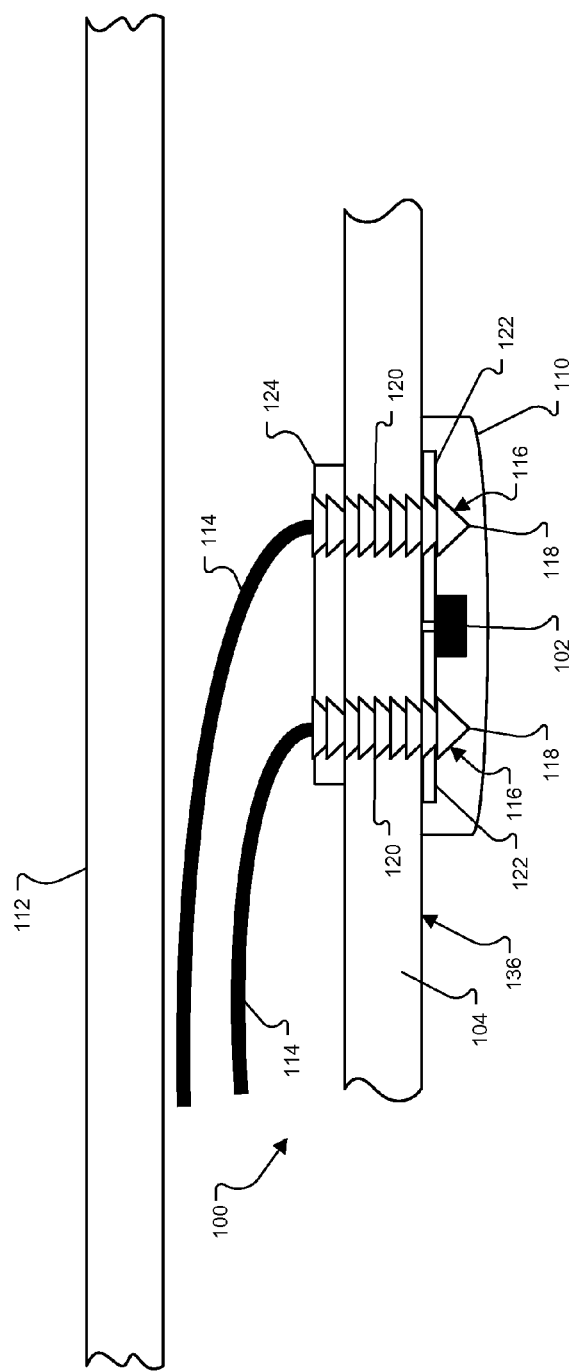
FIG. 2 is schematic, cross-sectional side view of the headliner assembly of FIG. 1.

With respect to FIG. 2, a schematic, cross-sectional side view is presented of an example of headliner assembly 100 made in accordance with the teaching of the present disclosure. As illustrated, the headliner assembly 100 includes the microphone 102 (e.g., an electret microphone or a MEMS (Micro-Electrical Mechanical System) microphone) which is mounted in a finishing grill 110 (e.g., a molded plastic grill) and installed on the passenger cabin facing side of the headliner 104 such that a sound receiving portion of the microphone 102 (i.e., a portion configured to receive sound energy) faces into a passenger cabin 20 (FIG. 1) of the vehicle 10 and such that the headliner 104 is disposed between the microphone 102 and a roof panel 112 of the vehicle 10.

Electrical wiring 114 for the microphone 102 is arranged along an opposite, roof panel facing surface of the headliner 104, e.g., such that the electrical wiring 114 is disposed within a region (gap) between the headliner 104 and the roof panel 112. The electrical wiring 114 is electrically connected (e.g., soldered or crimped) to barbed contact pins 116. The barbed contact pins 116 include sharp tips 118, which can be pushed through the headliner 104; and small, rigid barbs 120, which help to mechanically secure the barbed contact pins 116 in the headliner 104. The microphone 102 and grill 110 can then be press fit onto the protruding barbed contact pins 116 to both lock the grill 110 in place and to create an electrical connection between the electrical wiring 114 and electrical contacts 122 for the microphone 102.

In the illustrated example, the barbed contact pins 116 engage the electrical contacts 122 for the microphone 102, such that the barbed contact pins 116 and the electrical contacts 122 serve as mounting hardware for the microphone 102. The electrical contacts 122 are electrically connected to respective electrical terminals of the microphone 102. In the illustrated example, the barbed contact pins 116 are supported in a contact mount 124. The mount 124 may be formed of a rigid, non-conductive material, such as a rigid plastic. The mount 124 keeps the barbed contact pins 116 spaced at a distance that allows them to engage the separate electrical contacts 122 and can also help to add structural support to the headliner 104 which may include fabric and/or foam and/or other relatively weak material.

The microphone 102 and electrical contacts 122 may be secured in the grill 110 by fastening means, such as, but not limited to, mechanical fasteners, adhesives, welds, or snap-fit arrangement, thereby forming a sub-assembly which can be secured to the protruding portions of the barbed contact pins 116.

Figure 3:
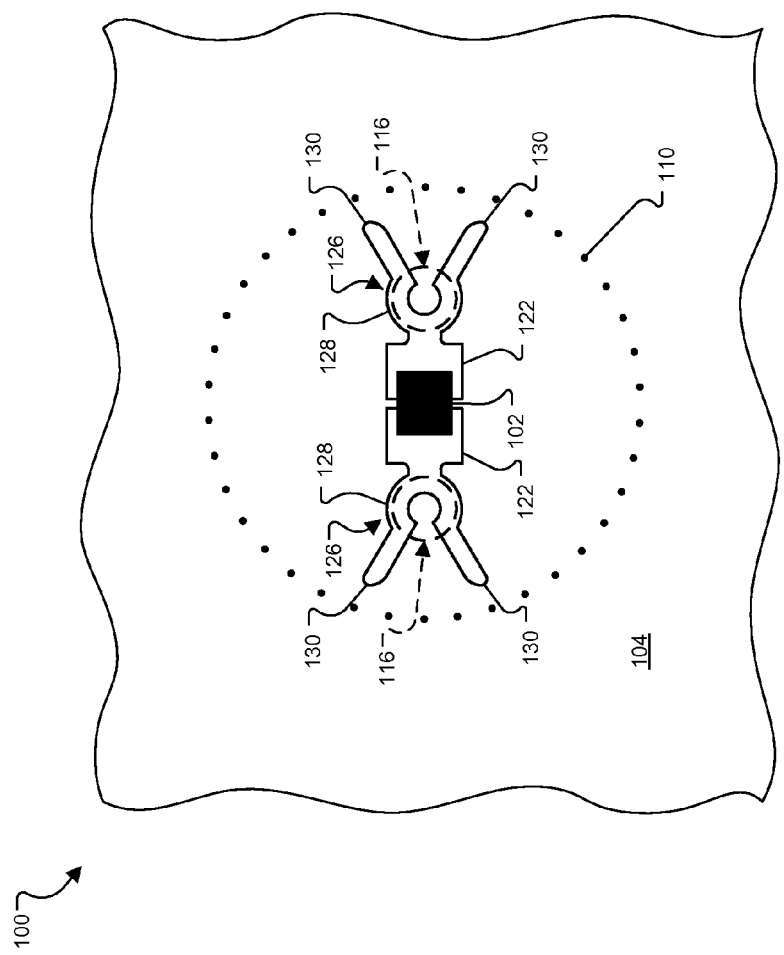
FIG. 3 is a schematic plan view of the headliner assembly of FIG. 1.

FIG. 3 shows a plan view of the microphone 102 and electrical contacts 122. In the illustrated example, the electrical contacts 122 include barb locks 126 which receive and lock onto the protruding ends of the barbed contact pins 116 (shown in dashed lines in FIG. 3). The barb locks 126 may consist of a pair of spring arms 128 configured to wrap around the barbed contact pins 116 to provide a secure electrical and mechanical connection therebetween.

In some cases, the distal ends 130 of the spring arms 128 may be accessible through the side of the finishing grill 110 (shown in dotted line in FIG. 3) so as to allow an operator to pry the spring arms 128 apart for easier removal from the barbed contact pins 116 (e.g., if the microphone needs to be replaced). This may also allow for easier installation by allowing the barbed contact pins 116 to more easily pass between the spring arms 128 while they are pried apart, rather than relying on contact forces between the barbed contact pins 116 and the spring arms 128 to force the spring arms 128 apart as the microphone 102 is fitted onto the barbed contact pins 116.

Figure 4:
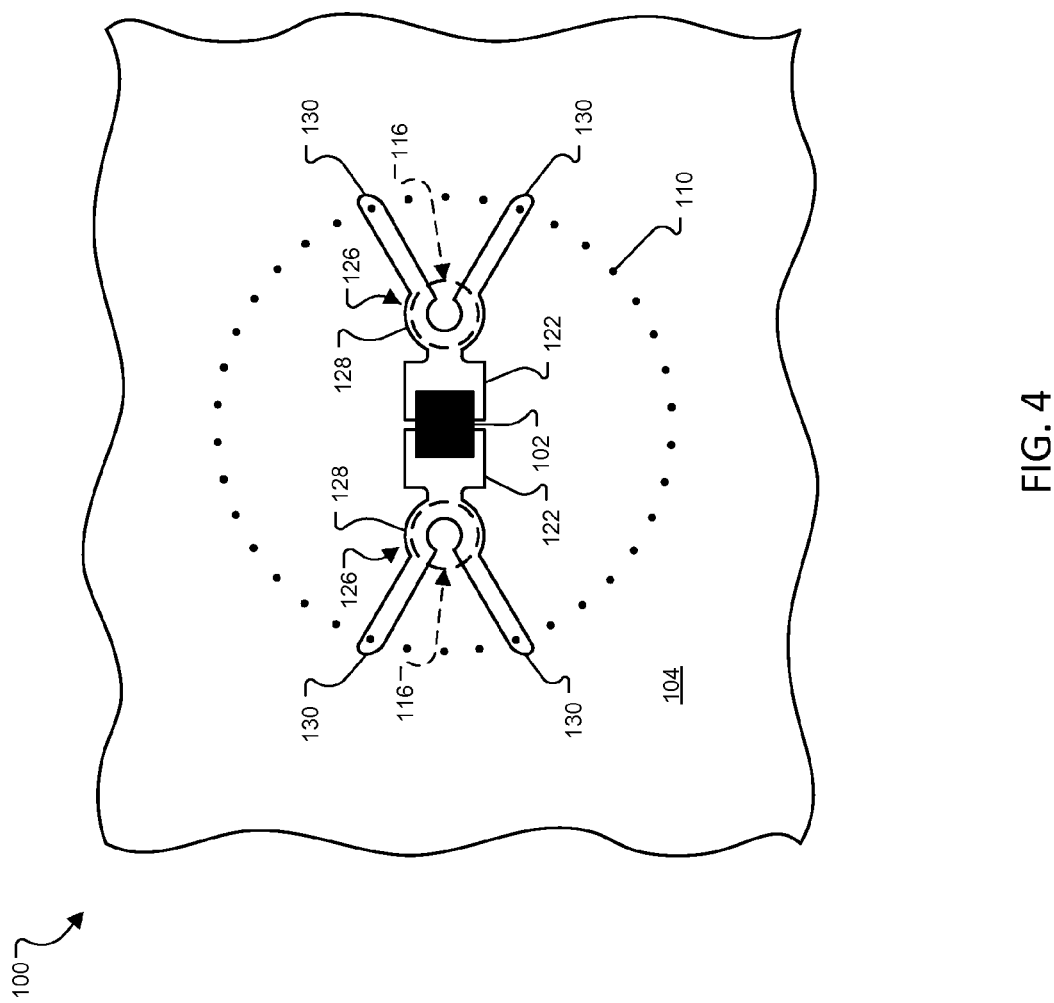
FIG. 4 is a schematic plan view of an alternative configuration of the headliner assembly of FIG. 3.

As shown in FIG. 4, in some cases the distal ends 130 of the spring arms 128 may extend to or beyond the periphery of the finishing grill 110 so as to allow an operator to pry them apart by hand or with the aid of a tool to aid in mounting and/or removing the sub-assembly from the barbed contact pins 116.

Figure 5:
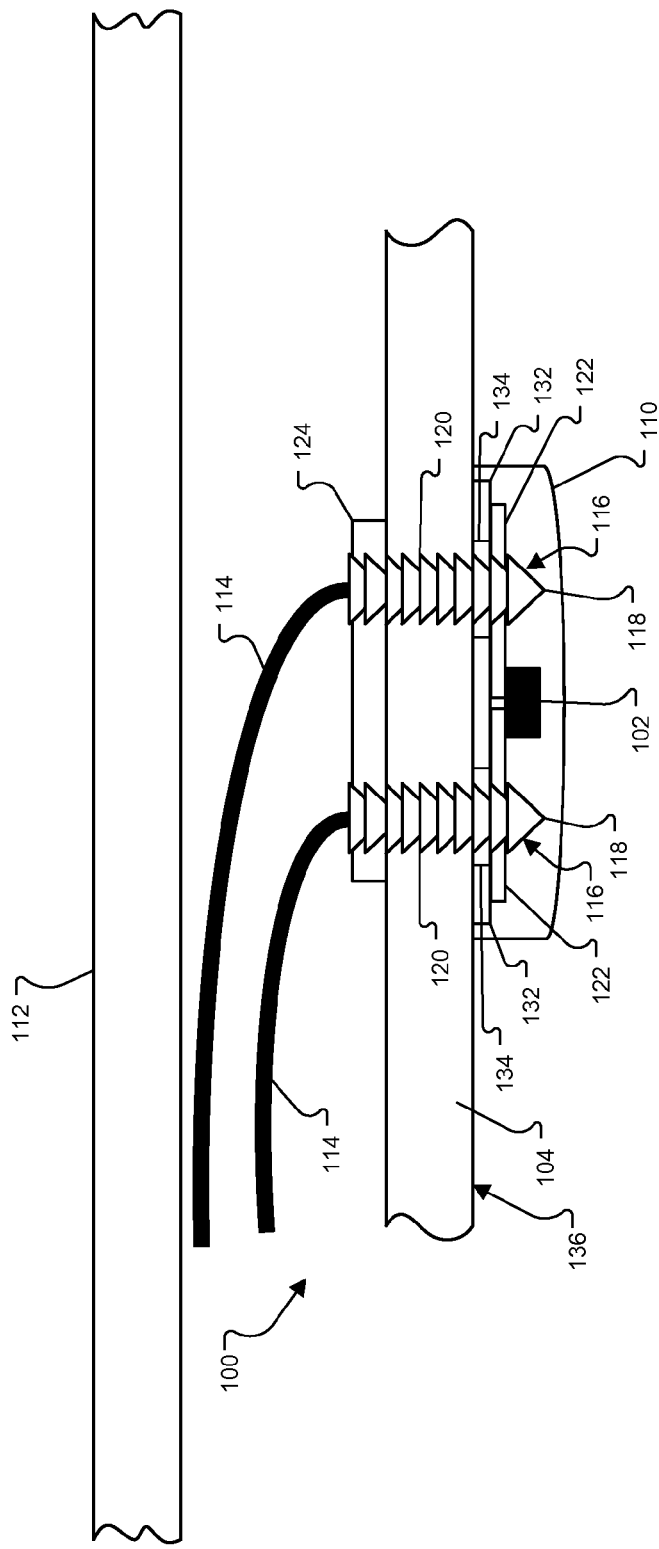
FIGS. 5 through 9 are schematic, cross-sectional side views each illustrating an alternative configuration of a headliner assembly.

Alternatively or additionally, the finishing grill 110 can be configured to be separable from the microphone 102 and electrical contacts 122 to allow for easier access to the distal ends of the spring arms 128. For example, as shown in FIG. 5, the microphone 102 and electrical contacts 122 may be mounted on a support plate 132. The finishing grill 110 can be configured to attach to the support plate 132, e.g., via fasteners, or a threaded or snap-fit connection between the finishing grill 110 and the support plate 132. The support plate 132 can include holes 134 to allow the barbed contact pins 116 to pass therethrough.

Notably, in the examples described herein, the microphone 102 is mounted on the inner, passenger cabin facing surface 136 of the headliner 104 such that no sensing hole is needed in the headliner 104 in order to allow the microphone 102 to sense the cabin-side noise. Consequently, a sensing hole (for allowing the microphone to sense cabin-side noise) is unnecessary, so there is no need for a seal that may otherwise degrade with age and extreme temperature cycles and thus compromise the noise sensing performance of the microphone 102. This mounting method can also allow the microphone 102 to be easily repositioned even after the headliner mold is created. That is, a mold for forming the headliner 104 does not have to be changed (i.e., to change the location of a sensing hole) merely to accommodate change in the location of the microphone 102. This mounting method can also allow active noise reduction to be added to an in-production car model at a relatively low cost, since the headliner molds will not have to be altered. Replacement of the microphone 102 is easier and can be done with the headliner 104 in place since it is accessible through the passenger cabin 20 (FIG. 1). Furthermore, by having the headliner 104 disposed between the microphone 102 and the roof panel 112, the headliner 104 not only shields the microphone 102 from external noise (i.e., noise external to the vehicle cabin) but also provides temperature shielding to help protect the microphone 102 from the temperature extremes that it might otherwise be exposed to if it were disposed in the region between the headliner 104 and the roof panel 112.

Other Implementations

Figure 6:
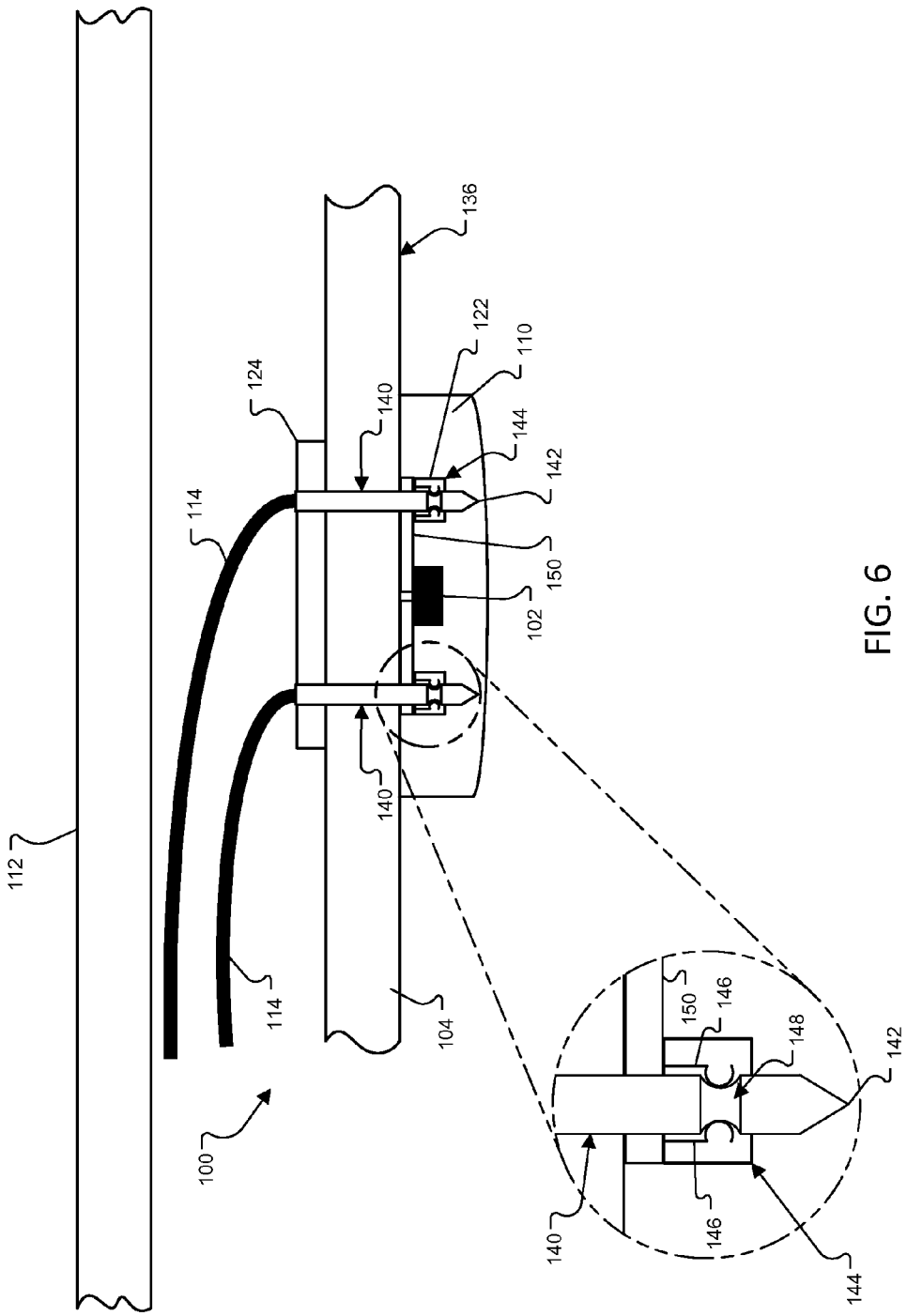

While an implementation has been described in which barbed contact pins 116 and barb locks are used to provide a secure electrical and mechanical connection, other implementations are possible. For example, FIG. 6 illustrates an implementation in which the electrical wiring 114 is electrically connected to electrical contact pins 140 having an alternative form. The electrical contact pins 140 can include sharp tip 142 for piercing the headliner 104.

In the illustrated example, the electrical contacts 122 comprise electrical sockets 144. The electrical contact pins 140 are configured to engage the electrical sockets 144 which are electrically connected (e.g., via metal conductors 150) to respective electrical terminals of the microphone 102. In some cases, the microphone 102 and the electrical sockets 144 may be mounted on a printed wiring board and the metal conductors 150 may be electrical traces on the printed wiring board.

The electrical contact pins 140 are supported in a contact mount 124 which keeps the electrical contact pins 140 spaced at a distance that allows them to engage the separate electrical sockets 144 and which also helps to add structural support to the headliner 104 which may include fabric and/or foam and/or other relatively weak material. In some cases, the contact mount 124 may be a printed wiring board. In such cases, the electrical contact pins 140 may be mounted in plated through-holes in the printed wiring board, and connection between the electrical wiring 114 and the electrical contact pins can be made via electrical traces on the printed wiring board. For example, the electrical wiring 114 may connect to the printed wiring board via mating connectors on the electrical wiring and the printed wiring board, or the electrical wiring 114 may have a solder connection to pads, terminals, or plated through-holes on the printed wiring board.

The electrical sockets 144 can include spring contacts 146 to frictionally engage and form electrical connection with the tip end of the electrical contact pins 140. The electrical contact pins 140 and the electrical sockets 144 also serve as mounting hardware for the microphone 102. In some cases, the pins may include a detent 148 (e.g., a circumferential detent) which the spring contacts 146 can engage to assist in providing a secure mechanical and electrical connection between the sockets 144 and the electrical pins 140. Alternatively, the contact may be simply a frictional contact between the spring contacts 146 and the pin 140.

Figure 7:
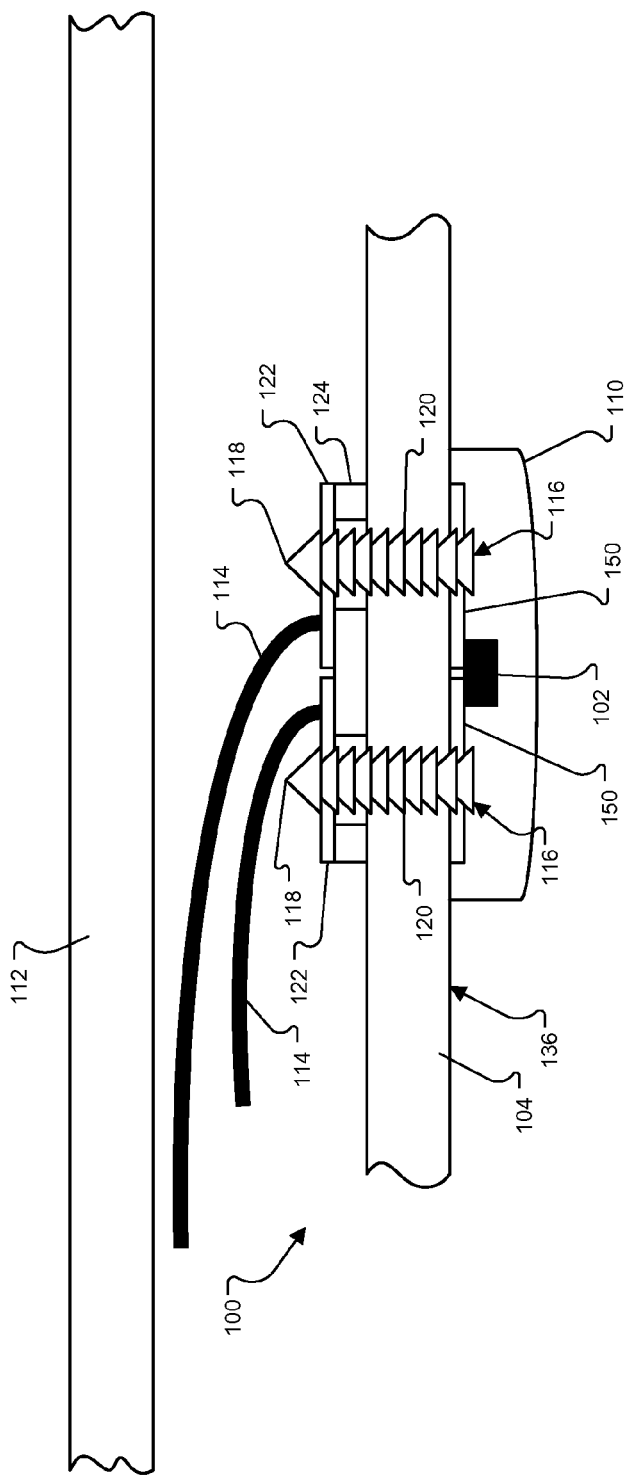

In some implementations, the orientation of the barbed contact pins may be reversed. For example, FIG. 7 illustrates an implementation in which the barbed contact pins 116 are electrically connected to the microphone 102 via metal conductors 150. In this configuration, the barbed contact pins 116 are pushed through the headliner 104 from the passenger cabin side of the headliner 104 such that pointed ends of the barbed contact pins 116 protrude from the roof panel facing surface of the headliner 104.

In the implementation illustrated in FIG. 7, the contact mount 124 supports the electrical contacts 122 which are electrically connected, e.g., soldered, to the electrical wiring 114.

The orientation of the electrical contact pins 140 and sockets 144 of FIG. 6 may be similarly reversed, such that the sockets are mounted on the roof panel facing surface of the headliner, and such that the electrical contact pins are inserted through the headliner from the passenger cabin.

Figure 8:
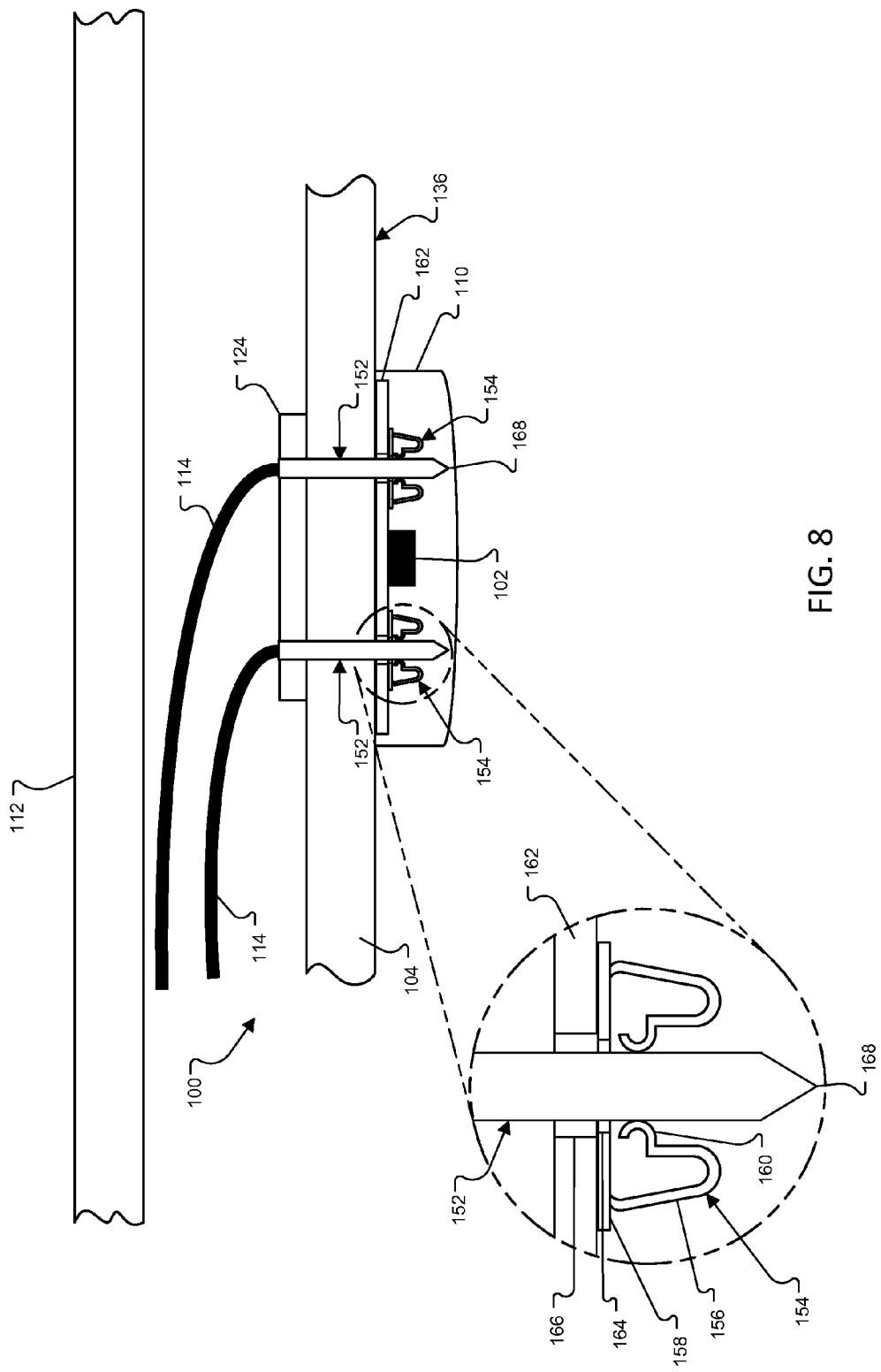

FIG. 8 illustrates an alternative electrical contact pin 152 and socket 154 configuration for providing a mechanical and electrical connection between the microphone 102 and the electrical wiring 114. In the implementation illustrated in FIG. 8, the socket 154 is a surface mount receptacle which includes a pair of electrically conductive spring contacts 156. Each of the spring contacts 156 includes a first end that is attached to a base 158 and a second end that includes a convex portion 160 that provides a contact point for the electrical contact pin 152. The base 158 can be formed integrally with the spring contacts 156 (e.g., in a stamping process) out of a single piece of conductive material. The base 158 is configured to be soldered to surface mount pads on a first surface of a printed wiring board 162 The microphone 102 may also be mounted on the printed wiring board 162 (e.g., on the first surface of the printed wiring board 162) and electrical connection between the microphone 102 and the base 158 can be made via electrical traces on the printed wiring board 162. An opposite, second surface of the printed wiring board 162 can rest against the passenger cabin facing surface 136 of the headliner 104.

In the illustrated example, the base 158 includes a through-hole 164 which can align with a through-hole 166 in the printed wiring board 162 so that a sharp distal end 168 of the pin 152 can be forced through the headliner 104, pass through the through-hole 166 in the printed wiring board 162, and then into contact with the spring contacts 156 such that the convex portions 160 of the spring contacts 156 engage the surface of the pin 152 in a wiping (frictional) action. Suitable socket receptacles for this purpose are commercially available from Autosplice, Inc. headquartered in San Diego, Calif.

The microphone 102 and printed wiring board 162 may be secured in the grill 110 by fastening means, such as, but not limited to, mechanical fasteners, adhesives, welds, or snap-fit arrangement, thereby forming a sub-assembly which can be secured to the protruding portions of the electrical contact pins 152.

Figure 9:
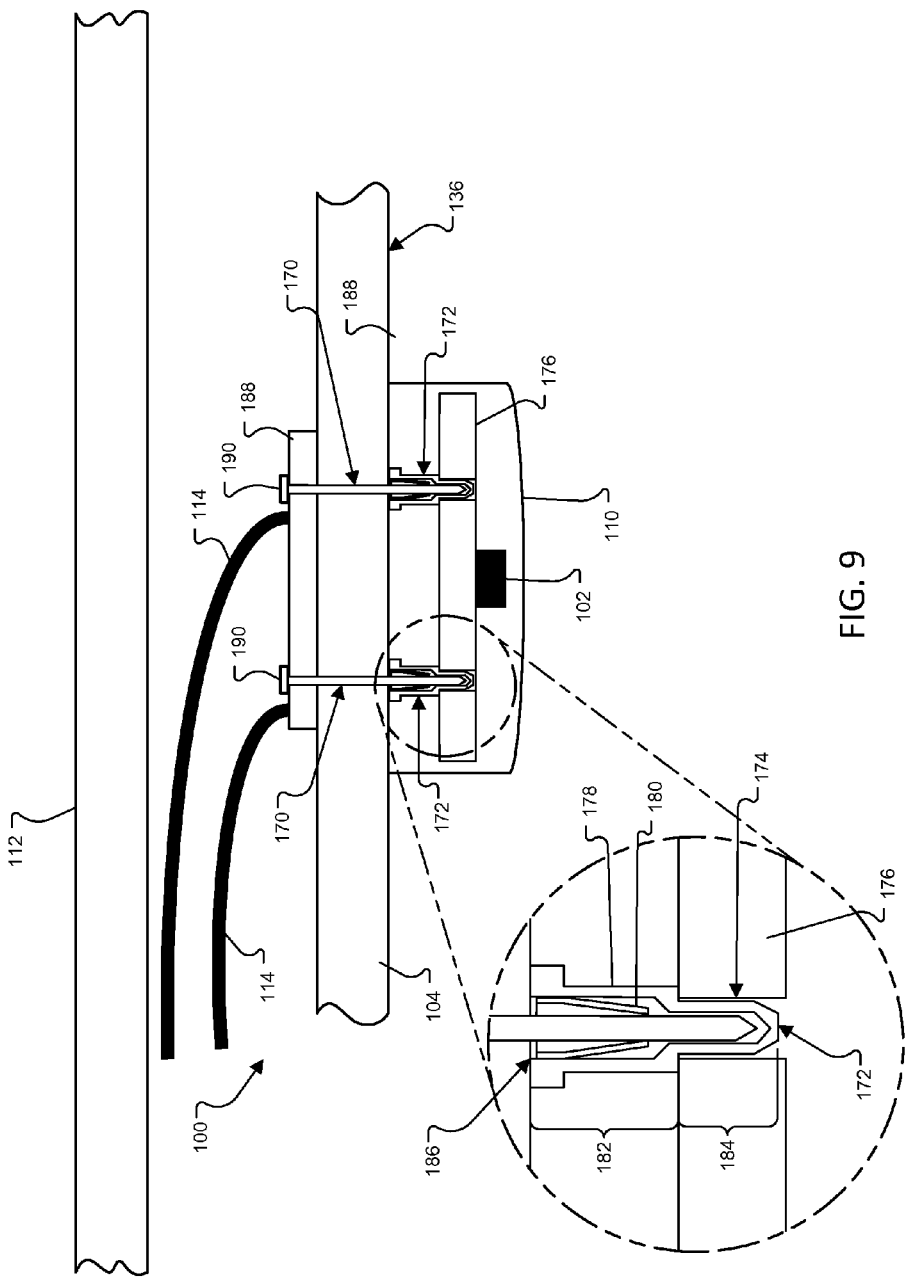

FIG. 9 illustrates yet another electrical contact pin 170 and socket 172 configuration for connecting the microphone 102 and the electrical wiring 114. In the implementation illustrated in FIG. 9, the socket 172 is in the form of a cup shaped receptacle that is configured to be mounted in a plated through-hole 174 in a printed wiring board 176. The socket 172 includes a cup portion 178 which houses spring contacts 180 that are configured to engage the electrical contact pin 170 to wipe against the surface of the pin 170 as the spring arms 180 bend slightly. The cup portion 178 has a first section 182 which extends from a first, open end 186 to a second section 184. The second section 184 is smaller in diameter than the first section 182 and forms a shoulder with the first section 182. The second section 184 of the cup portion 178 is configured to sit within the plated through-hole 174, soldered in place, in the printed wiring board 176 with the shoulder resting on the surface of the printed wiring board 176.

In the illustrated example, the microphone 102 is mounted on a first surface of the printed wiring board 176 which is arranged to face towards the passenger cabin. The open end 186 of the socket 172 is disposed along the opposite, second surface of the printed wiring board 176 and is arranged to receive a portion of the pin 170 is extends from the passenger cabin facing surface 136 of the headliner 104.

In the example of FIG. 9, the electrical contact pin 170 is configured to be mounted (soldered) in a plated through-hole in a printed circuit board (shown as a roof side printed wiring board 188 in the illustrated example). The roof side printed circuit board 188 can also serve as a contact mount for the pins 170. The pins 170 include a flat head 190 which can rest against the surface of the printed wiring board 188. Electrical connection between the pins 170 and the electrical wiring 114 can be made via conductive trace on the printed wiring board 188. The electrical wiring 114 can be connected to the printed wiring board 188 via a solder joint (e.g., via a surface mount pad or plated through-hole); or via mating electrical connectors on the electrical wiring 114 and the printed circuit board 188. Alternatively or additionally, the electrical wiring 114 can be attached directly to the pins 170. Such drop through pin and socket pairs are available from Autosplice, Inc., and are typically employed for stacking parallel printed circuit boards.

The microphone 102 and the passenger compartment side printed wiring board 176 may be secured in the grill 110 by fastening means, such as, but not limited to, mechanical fasteners, adhesives, welds, or snap-fit arrangement, thereby forming a sub-assembly which can be secured to the protruding portions of the electrical contact pins 170.

A number of implementations have been described. Nevertheless, it will be understood that additional modifications may be made without departing from the scope of the inventive concepts described herein, and, accordingly, other embodiments are within the scope of the following claims.

What is claimed is:

1. A headliner assembly for a vehicle, the headliner assembly comprising:
    a headliner configured for attachment to the vehicle such that the headliner separates a passenger cabin of the vehicle from a roof panel of the vehicle and such that a first surface of the headliner faces the roof panel, and an opposite, second surface of the headliner faces the passenger cabin; and
    a microphone,
    wherein the microphone is mounted along the second surface of the headliner such that, when installed in the vehicle, the headliner is disposed between the microphone and the roof panel.

2. The headliner assembly of claim 1, wherein the microphone is not coincident with any recess or opening in the headliner.

3. The headliner assembly of claim 1, further comprising one or more electrical wires arranged along the first surface of the headliner, and one or more contact pins for providing an electrical connection between the microphone and the one or more electrical wires.

4. The headliner assembly of claim 3, wherein each of the one or more contact pins includes a pointed end for piercing through the headliner.

5. The headliner assembly of claim 3, wherein the one or more contact pins comprises barbs.

6. The headliner assembly of claim 3, further comprising one or more electrical contacts electrically connected to the microphone and configured to engage the one or more contact pins thereby to mechanically secure the microphone to the second surface of the headliner and to electrically connect the microphone to the one or more electrical wires.

7. The headliner assembly of claim 6, wherein the microphone is supported in a finishing grill, and wherein the one or more electrical contacts are configured to engage the one or more contact pins thereby to secure the microphone and the finishing grill on the second surface of the headliner.

8. The headliner assembly of claim 6, wherein the one or more electrical contacts comprise one or more electrical sockets electrically connected to the microphone, the one or more electrical sockets comprising spring contacts for engaging the one or more contact pins thereby to mechanically secure the microphone to the second surface of the headliner and to electrically connect the microphone to the one or more electrical wires.

9. The headliner assembly of claim 8, wherein the spring contacts are configured to frictionally engage the one or more electrical contact pins in a wiping action.

10. The headliner assembly of claim 3, further comprising a sub-assembly, the sub-assembly comprising:
    the microphone; and
    a finishing grill,
    wherein the sub-assembly is configured to engage the one or more contact pins thereby to mechanically secure the sub-assembly to the second surface of the headliner and to electrically connect the microphone to the one or more electrical wires.

11. The headliner assembly of claim 1, wherein the microphone is a noise collecting microphone for providing input to an active noise reduction system, the microphone being mounted such that a sound receiving portion of the microphone is arranged to face the passenger cabin of the vehicle.

12. The headliner assembly of claim 1, wherein the microphone is mounted to the headliner with mounting hardware, wherein the mounting hardware is configured to pierce holes in the headliner.

13. The headliner assembly of claim 12, further comprising one or more electrical wires arranged along the first surface of the headliner, wherein the mounting hardware provides an electrical connection between the microphone and the one or more electrical wires.

14. The headliner assembly of claim 12, wherein the mounting hardware comprises one or more contact pins, each of the one or more contact pins having a pointed tip for piercing through the headliner.

15. The headliner assembly of claim 1, wherein the microphone is a MEMS microphone.

16. The headliner assembly of claim 1, further comprising:
    a plurality of electrical wires arranged along the first surface of the headliner;

a plurality of contact pins for providing electrical connection between the wires and the microphone; and a plurality of electrical contacts electrically connected to the microphone, wherein the electrical contacts are configured to engage the contact pins thereby to establish an electrical connection with the electrical wires.

17. The headliner assembly of claim 16, wherein the electrical contacts comprise spring arms for engaging the contact pins.

18. The headliner assembly of claim 16, wherein the contact pins are mounted on a contact mount that keeps the contact pins spaced apart at a predetermined distance.

19. A method comprising:

piercing holes in a vehicle headliner by passing contact pins into a first surface of the vehicle headliner, and through the vehicle headliner, such that portions of the contact pins extend beyond an opposite, second surface of the vehicle headliner, the first surface of the vehicle headliner being configured to face a roof panel of a vehicle, and the opposite, second surface of the headliner being configured to face a passenger cabin of the vehicle; and securing a microphone to the second surface of the vehicle headliner by connecting electrical contacts, which are attached to the microphone, to the portions of the contact pins which extend beyond the second surface of the vehicle headliner.

20. The method of claim 19, wherein the step of securing the microphone comprises securing the microphone such that, when installed in the vehicle, the vehicle headliner is disposed between the microphone and the roof panel, and such that the microphone is not coincident with any recess or opening in the headliner.

21. The method of claim 19, further comprising mounting the microphone in a grill and thereby forming a sub-assembly, wherein the step of securing the microphone to the second surface of the vehicle headliner comprises attaching the sub-assembly to the portions of the contact pins which extend beyond the second surface of the vehicle headliner.

* * * * *